(12) United States Patent
Ajioka

(10) Patent No.: US 9,153,274 B2
(45) Date of Patent: Oct. 6, 2015

(54) MICROWAVE-ASSISTED MAGNETIC HEAD, HEAD GIMBAL ASSEMBLY, AND MAGNETIC RECORDING AND REPRODUCING DEVICE

(71) Applicant: TDK CORPORATION, Tokyo (JP)

(72) Inventor: Eriko Ajioka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/281,469

(22) Filed: May 19, 2014

(65) Prior Publication Data

US 2014/0340782 A1    Nov. 20, 2014

(30) Foreign Application Priority Data

May 20, 2013  (JP) ................................. 2013-106262
Apr. 16, 2014  (JP) ................................. 2014-084691

(51) Int. Cl.
*G11B 11/10*  (2006.01)
*G11B 5/00*  (2006.01)

(52) U.S. Cl.
CPC ........ *G11B 11/10* (2013.01); *G11B 2005/0024* (2013.01); *Y10T 428/1171* (2015.01)

(58) Field of Classification Search
USPC ....................................... 360/125.31, 125.74
See application file for complete search history.

(56) References Cited

U.S. PATENT DOCUMENTS

| 8,031,426 | B2 | 10/2011 | Ikeda et al. | |
| 2010/0073804 | A1* | 3/2010 | Ikeda et al. | 360/59 |
| 2012/0127610 | A1* | 5/2012 | Aoyama et al. | 360/123.05 |
| 2012/0243117 | A1* | 9/2012 | Aoyama et al. | 360/59 |
| 2012/0314326 | A1* | 12/2012 | Takeo et al. | 360/125.03 |

FOREIGN PATENT DOCUMENTS

| JP | A-2010-186522 | 8/2010 |
| JP | B2-4590003 | 12/2010 |
| JP | A-2011-086342 | 4/2011 |

OTHER PUBLICATIONS

Zhu et al., "Microwave Assisted Magnetic Recording (MAMR)," The Magnetic Recording Conference (TMRC), 2007, pp. 34-35, Paper B6.

* cited by examiner

*Primary Examiner* — Wayne Young
*Assistant Examiner* — Carlos E Garcia
(74) *Attorney, Agent, or Firm* — Oliff PLC

(57) ABSTRACT

A microwave-assisted magnetic head provides a high-reliability microwave-assisted magnetic head that reduces effective coercivity by giving microwave energy to a magnetic recording medium in an auxiliary manner and writes a data signal, a head gimbal assembly, and a magnetic recording and reproducing apparatus. A microwave magnetic field generating element is arranged on a trailing shield side or a reproducing head element side with respect to a main magnetic pole that generates a recording magnetic field for writing a data signal into a magnetic recording medium, the microwave magnetic field generating element having a coil configuration in which a plurality of microwave magnetic field generating lines and a return line are formed by a continuous single line.

11 Claims, 13 Drawing Sheets

MICROWAVE-ASSISTED MAGNETIC HEAD, HEAD GIMBAL ASSEMBLY, AND MAGNETIC RECORDING AND REPRODUCING DEVICE

BACKGROUND

The present invention relates to a magnetic head for magnetic recording, a head gimbal assembly, and a magnetic recording and reproducing apparatus, and more specifically to a microwave-assisted magnetic head and a line configuration of a microwave magnetic field generating element.

It is desired to increase a recording density of a magnetic recording medium device, which is a magnetic recording device. In order to achieve a signal quality (an S/N ratio) necessary for high-density recording, as a areal recording density increases, it is necessary to make magnetic particles be smaller that constitute a magnetic recording medium. However, magnetic particles that have been made smaller tend to lose magnetization because of thermal fluctuations. In order to prevent this and keep a stable recording state, it is necessary to increase magnetic anisotropy energy Ku of magnetic particles. For magnetic particles having uniaxial magnetic anisotropy, the strength of a magnetic field necessary to make magnetization reversal is called an anisotropic magnetic field (Hk), which is expressed using saturation magnetization (Ms) and magnetic anisotropy energy (Ku) as Hk=2Ku/Ms. Thus, in the case where a material having a high Ku is used, Hk is increased and a higher recording magnetic field is necessary to perform recording on a magnetic recording medium. In contrast, as a areal recording density is increased, the size of a recording head element is reduced. Thus, the strength of a magnetic field that may be generated decreases proportionately with the size of a recording head. As a result, recording to be performed on the magnetic recording medium becomes difficult.

To perform magnetization reversal of a recording film in accordance with desired data series, a write head element of a thin film magnetic head needs to apply an abrupt recording magnetic field having, at maximum, an strength of the order of the anisotropic magnetic field (Hk) of the recording film. In a magnetic disk drive (HDD) that has become commercially practical using a perpendicular magnetic recording method, a write head element using a so-called monopole is used and a recording magnetic field is applied to a recording film in a perpendicular direction from a surface of an air bearing surface (ABS) of the recording head element. The strength of this perpendicular recording magnetic field is proportional to a saturation magnetic flux density (Bs) of a soft magnetic material that constitutes the monopole, and thus a material having a saturation magnetic flux density (Bs) that is made as high as possible has been developed and has become commercially practical. However, as a saturation magnetic flux density (Bs), Bs=2.4 T (tesla) is practically the upper limit from a so-called Slater-Pauling curve, and a value obtained under present circumstances is approaching the practical limit. In addition, the thickness and width of a monopole currently used is on the order of about 100 nm to 200 nm; however, in the case where a recording density is increased, it is necessary to further reduce the thickness and width. As a result, a perpendicular magnetic field to be generated is further reduced.

In this manner, under present circumstances, it is becoming more difficult to achieve higher density recording because of the limit of the recording capability of a write head element. In order to solve this technical problem, energy assisted recording has been proposed in which, when recording is performed, energy is applied to a magnetic recording medium in an auxiliary manner and a recording magnetic field strength is reduced.

CITED REFERENCES

Non-Patent Reference 1

J. G. Zhu and X. Zhu, 'Microwave Assisted Magnetic Recording', The Magnetic Recording Conference (TMRC) 2007 Paper B6 (2007)

Patent References

[Patent Literature 1] Japanese Patent No. 4590003
[Patent Literature 2] Japanese Unexamined Patent Application Publication No. 2010-186522
[Patent Literature 3] Japanese Unexamined Patent Application Publication No. 2011-086342

In microwave assisted magnetic recording, a method in which a microwave magnetic field is supplied by a microwave oscillator arranged at the tip of a magnetic head and a method in which a microwave signal (power) supplied from a microwave power generator that is independent of a magnetic head is supplied to a microwave magnetic field generating line are known. As the former, a method using a spin-torque oscillator (spin-torque oscillator: STO) is well known (Patent Literature 1). The latter is called a externally oscillated MAMR method. This method is a method in which, when magnetic recording is performed, energy assistance is performed by supplying microwave power supplied from a microwave power generator to a microwave magnetic field generating line formed near a recording head element of a magnetic head slider and by generating a microwave magnetic field from the microwave magnetic field generating line (Patent Literatures 2 and 3).

In a externally oscillated microwave assisted magnetic recording method, for a conventional microwave magnetic field generating line, a configuration is known with which a microwave is generated by arranging a microwave magnetic field generating line at the tip of a head and supplying microwave power (Patent Literatures 2 and 3).

[Non-Patent Literature]
[Non-Patent Literature 1]

A recording method using a microwave magnetic field as an auxiliary energy source is called a microwave assisted magnetic recording (Microwave Assisted Magnetic Recording: MAMR). (Non-Patent Literature 1)

SUMMARY

Power supplied to a microwave magnetic field generating element is denoted by Po [dBW], and the impedance of a microwave power generator viewed from the microwave magnetic field generating element by Zo [Ω]. In the case where the microwave magnetic field generating element is an ideal element having a value of resistance of 0 [Ω] and connected to a short circuited terminal, Po and a maximum current i that flows in the element is expressed by a relational expression as in Math 1.

$$i = \sqrt{\frac{10^{\frac{P_o}{10}}}{Z_o}} \times 2\sqrt{2} \qquad \text{[Math 1]}$$

In order to increase the strength of a generated magnetic field with a conventional configuration, in accordance with Ampere's law as expressed by Math 2, it is necessary to increase the amount of current that flows through a microwave magnetic field generating line or to reduce the radius of a microwave magnetic field generating line.

$$H=i/2\pi a \quad \text{[Math 2]}$$

(Here, H: magnetic field strength, i: current, a: the distance from the center of a conductor)

By increasing the amount of current that flows through a microwave magnetic field generating line, reducing a cross-section area of the microwave magnetic field generating line, and reducing the distance between the magnetic field generating line and a recording medium, the strength of a microwave magnetic field to be applied to the medium may be increased. However, the amount of heat is increased by an increase in the current that flows through the microwave magnetic field generating line and an increase in the value of resistance of the line. As a result, a problem arises in that the reliability is decreased by an element whose line is broken by heat.

The present invention has been made in light of the above-described problems, and it is an object of the present invention to provide a microwave-assisted magnetic head that prevents microwave magnetic field generating lines from being broken, that is highly reliable, and that may efficiently increase a microwave magnetic field strength by arranging a plurality of microwave magnetic field generating lines of a microwave magnetic field generating element. In addition, another object of the present invention is to provide a head gimbal assembly and a magnetic recording and reproducing apparatus including such a microwave-assisted magnetic head.

The present invention that solves the above-described problems is a microwave-assisted magnetic head, in which a microwave magnetic field generating element is arranged on a trailing shield side or a reproducing head element side with respect to a main magnetic pole main layer of a recording head element, the microwave magnetic field generating element having a coil configuration in which a plurality of microwave magnetic field generating lines and a return line are formed by a continuous single line.

In addition, the plurality of microwave magnetic field generating lines are configured such that a microwave current flows in the same direction.

Furthermore, the plurality of microwave magnetic field generating lines are arranged closer to an ABS side than the return line.

In addition, a distance between the plurality of microwave magnetic field generating lines is shorter than a distance between the microwave magnetic field generating line and the return line.

In addition, a cross-sectional area of at least one of the plurality of microwave magnetic field generating lines is smaller than a cross-sectional area of a line other than the microwave magnetic field generating lines through which a microwave current flows in a different direction from the direction of a microwave current flowing through the microwave magnetic field generating lines.

A frequency of a current that flows through the microwave magnetic field generating lines is between 1 GHz and 50 GHz.

In addition, a divisional arrangement is performed in which the microwave magnetic field generating lines and the return line are arranged on the trailing shield side and the reproducing head element side with respect to the main magnetic pole main layer.

According to the present invention, furthermore, a head gimbal assembly including the above-described microwave-assisted magnetic head may be provided.

According to the present invention, furthermore, a magnetic recording and reproducing apparatus including a magnetic recording medium and the above-described head gimbal assembly may be provided.

The present invention may provide a microwave-assisted magnetic head that prevents microwave magnetic field generating lines from being broken, that is highly reliable, and that may efficiently increase a microwave magnetic field strength by arranging a plurality of microwave magnetic field generating lines of a microwave magnetic field generating element. In addition, a head gimbal assembly and a magnetic recording and reproducing apparatus including such a microwave-assisted magnetic head may be provided.

DETAILED DESCRIPTION OF EMBODIMENTS

First Embodiment

Figure 1:
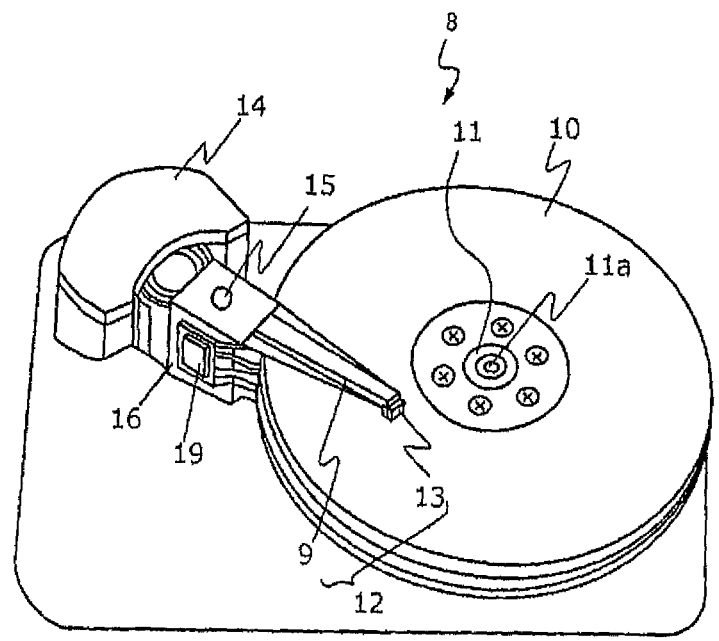
FIG. 1 is a schematic perspective view of a magnetic recording and reproducing device.

FIG. 1 illustrates a schematic perspective view of a magnetic recording and reproducing apparatus (magnetic disk device). A magnetic recording and reproducing apparatus 8 includes a plurality of magnetic recording medium (magnetic disks) 10 and a plurality of head gimbal assemblies (HGAs) 12, each of which includes a magnetic head slider 13.

An HGA 12 is constituted by a magnetic head slider 13 and a suspension 9 that supports the magnetic head slider 13. A magnetic recording medium 10 is rotated by a spindle motor 11 around a spindle motor rotation axis 11a. The magnetic head slider 13 performs writing and reading of a data signal on the magnetic recording medium 10.

The suspension 9 is fixed to a carriage 16, which is rotatable around a pivot bearing axis 15. The suspension 9 performs, using a VCM (voice coil motor) 14, alignment of the magnetic head slider 13 on the magnetic recording medium 10.

A microwave power generator 19 supplies microwave power to the magnetic head slider 13 when the magnetic head slider 13 operates for writing.

Figure 2:
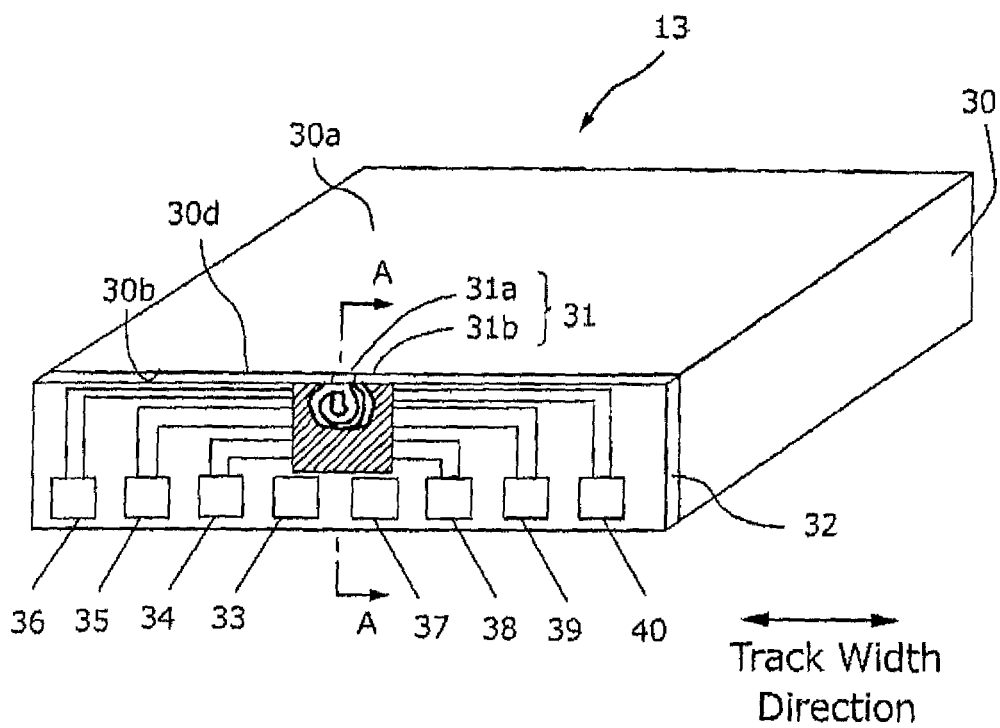
FIG. 2 is a perspective view schematically illustrating the entirety of a magnetic head slider.

FIG. 2 is a perspective view schematically illustrating the entirety of the magnetic head slider 13 in the present embodiment. The magnetic head slider 13 includes a magnetic head slider substrate 30, a magnetic head element 31, a protection unit 32, and eight terminal electrodes 33, 34, 35, 36, 37, 38, 39, and 40. The magnetic head slider substrate 30 includes an ABS (Air Bearing Surface) 30a, which has been processed so as to obtain an appropriate flying height. The magnetic head element 31 is provided on an element forming surface 30b, which is perpendicular to the ABS 30a. The protection layer 32 is provided on the element forming surface 30b so as to cover the magnetic head element 31. The eight terminal electrodes 33, 34, 35, 36, 37, 38, 39, and 40 are exposed from a surface of the protection layer 32. The terminal electrodes 33, 34, 35, 36, 37, 38, 39, and 40 do not have to be at positions illustrated in FIG. 2, and may be provided at any positions in any arrangement on this element forming surface 30b.

The magnetic head 31 includes a magnetoresistance effect (MR) reproducing head element 31a for reading a data signal from the magnetic recording medium 10 and a recording head element 31b for writing a data signal into the magnetic recording medium 10. The terminal electrodes 37 and 38 are electrically connected to the MR reproducing head element 31a. The terminal electrodes 35 and 36 are electrically connected to the recording head element 31b. The terminal electrodes 33 and 34 are electrically connected to a microwave magnetic field generating line 2 (FIG. 3), which will be described later.

An end portion of the MR reproducing head element 31a and an end portion of the recording head element 31b are positioned at the ABS 30a (more specifically, a magnetic head slider end face 30d of the ABS 30a). As a result of causing these ends of the MR reproducing head element 31a and the recording head element 31b to face the magnetic recording medium 10, a data signal is reproduced by receiving a signal magnetic field and a data signal is recorded by applying a signal magnetic field. A significantly thin coating of diamond-like carbon (DLC) or the like is applied for protection to the end of each element facing the ABS 30a and a portion near the end of the element.

Figure 3:
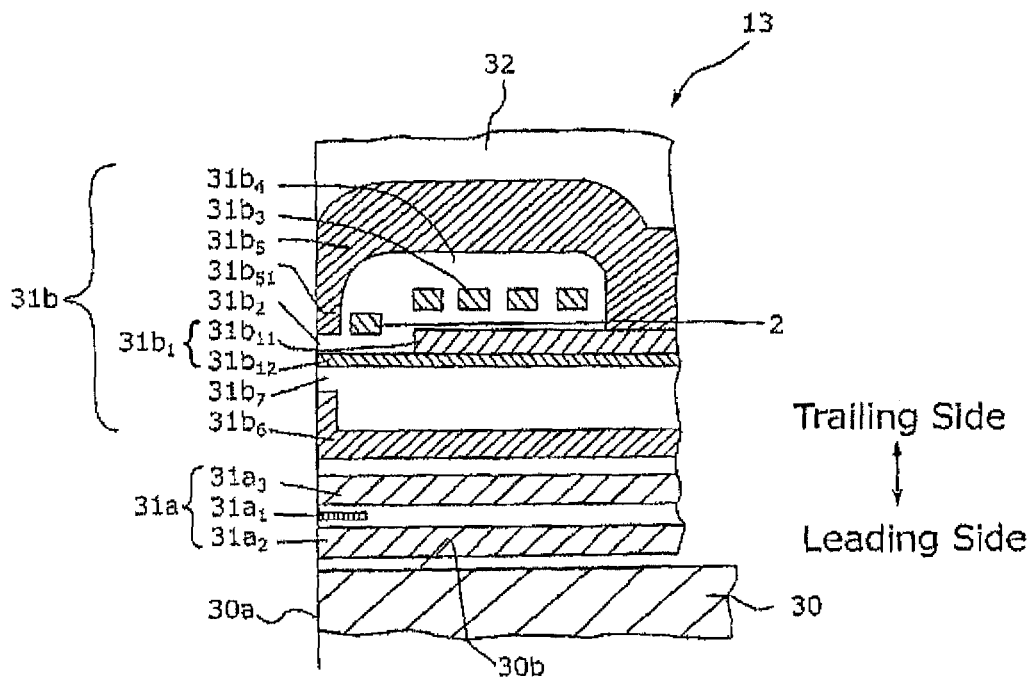
FIG. 3 is a cross-sectional view of FIG. 2, taken along line A-A.

FIG. 3 is a cross-sectional view of FIG. 2, taken along line A-A. The MR reproducing head element 31a, the recording head element 31b, a microwave magnetic field generating element 2, and the protection layer 32 for protecting these elements are mainly formed on the element forming surface 30b of the magnetic head slider substrate 30, which is composed of AlTiC (Al2O3-TiC) or the like.

The MR reproducing head element 31a includes an MR multilayer product 31a1, a bottom portion shield layer 31a2, and a top portion shield layer 31a3, the bottom portion shield layer 31a2 and the top portion shield layer 31a3 being arranged at positions so as to sandwich this multilayer product. The MR multilayer product 31a1 is constituted by a current-in-plane (CIP) GMR multilayer film, a current-perpendicular-to-plane (CPP) GMR multilayer film, or a TMR multilayer film, and receives a signal magnetic field from the magnetic recording medium 10. The bottom portion shield layer 31a2 and the top portion shield layer 31a3 prevent receiving of an effect of an external magnetic field, the external magnetic field being noise for the MR multilayer product 31a1.

The recording head element 31b has a configuration for perpendicular magnetic recording. Specifically, the recording head element 31b includes a main magnetic pole layer 31b1, a trailing gap layer 31b2, a write coil 31b3, a write coil insulating layer 31b4, an auxiliary magnetic pole layer 31b5, an auxiliary shield layer 31b6, and a leading gap layer 31b7, the write coil 31b3 being formed such that the write coil 31b3 extends between the main magnetic pole layer 31b1 and the auxiliary magnetic pole layer 31b5. The main magnetic pole layer 31b1 is a main magnetic pole of the recording head element 31b, and generates a write magnetic field from an end portion of the main magnetic pole layer 31b1 when a data signal is written, the end portion being on the side where the ABS 30a is provided.

The main magnetic pole layer 31b1 is a guide for guiding, to the magnetic recording medium 10 on which writing is to be performed, magnetic flux generated by supplying a write current to the write coil 31b3 such that the magnetic flux is converged. The main magnetic pole layer 31b1 is constituted by a main magnetic pole yoke layer 31b11 and a main magnetic pole main layer 31b12.

The auxiliary magnetic pole layer 31b5 and the auxiliary shield layer 31b6 are arranged on the trailing side and the leading side of the main magnetic pole layer 31b1, respectively. The trailing shield portion 31b51 faces the end portion of the main magnetic pole layer 31b1 positioned on the side where the ABS 30a is provided, via the trailing gap layer 31b2.

The recording head element 31b includes the microwave magnetic field generating element 2 on the side where the trailing shield portion 31b51 is provided with respect to the main magnetic pole main layer 31b12.

Figure 4:
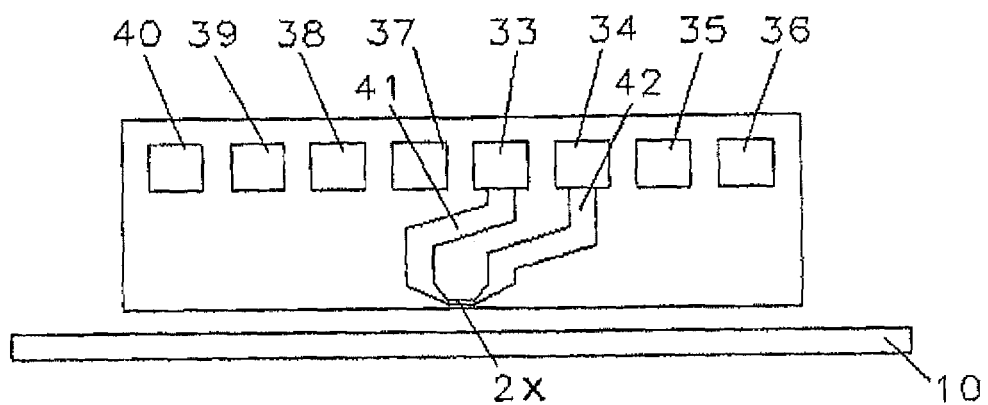
FIG. 4 is a diagram of the configuration of a conventional microwave magnetic field generating element, viewed from an element forming surface of a magnetic head slider.

FIG. 4 is a diagram of the configuration of a conventional microwave magnetic field generating element 2x, viewed from the element forming surface 30b of the magnetic head slider 13. The microwave magnetic field generating element 2x, which includes a microwave generating line having a single line configuration and arranged near the ABS surface of the magnetic head slider 13, and the terminal electrodes 33 and 34 are electrically connected by wiring members 41 and 42. As a result of supplying of a microwave drive current from the terminal electrodes, the microwave magnetic field generating element 2x generates a microwave magnetic field and applies the microwave magnetic field to the magnetic recording medium 10, which is near thereto.

Figure 5:
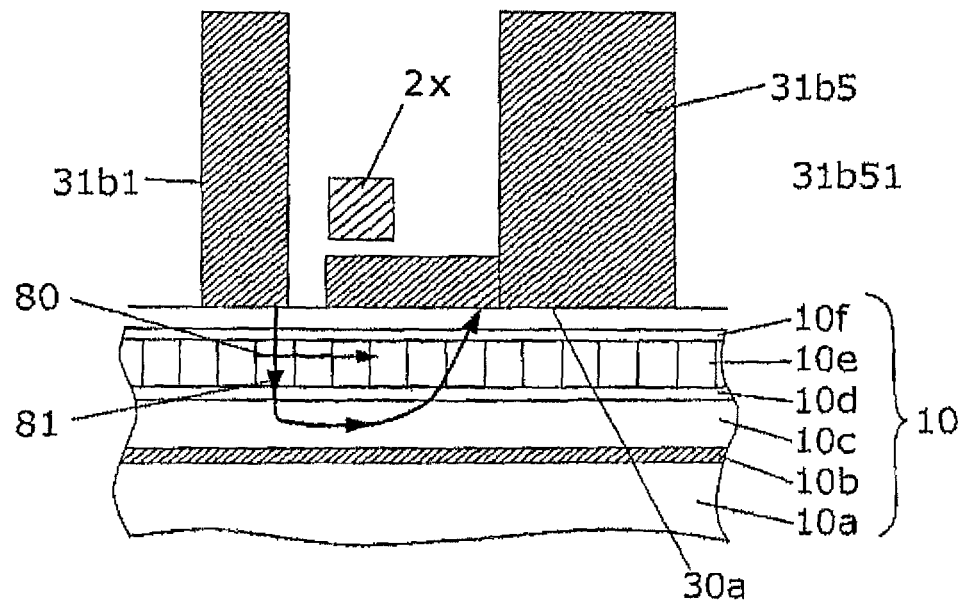
FIG. 5 is a cross-sectional view for describing the theory of a conventional microwave assisted magnetic recording method.

FIG. 5 is a cross-sectional view for describing the theory of a conventional microwave assisted magnetic recording method. The magnetic recording medium 10 is used for perpendicular magnetic recording, and has a multilayer configuration in which a magnetization orientation layer 10b, a soft magnetic under layer 10c which serves as a portion of a magnetic flux loop circuit, an intermediate layer 10d, a magnetic recording layer lee, and a protection layer 10f are staked in order on a disk substrate 10a.

The magnetization orientation layer 10b gives the soft magnetic under layer 10c magnetic anisotropy in the track width direction so as to make a magnetic domain configuration of the soft magnetic under layer 10c be stable and reduce spike noise in a reproducing output waveform. The intermediate layer 10d plays a role of a base layer that controls the magnetization orientation and particle diameter of the magnetic recording layer 10e.

A ferromagnetic resonance frequency FR of the magnetic recording layer 10e has a unique value determined by the shape, size, constituent elements, and the like of magnetic particles that constitute the magnetic recording layer 10e, and is on the order of from about 1 GHz to about 50 GHz.

A microwave magnetic field is generated around the microwave magnetic field generating line by causing a microwave drive current to flow through the microwave magnetic field generating element 2x. Since the microwave magnetic field generating line is near the magnetic recording medium 10, a resonance magnetic field 80 is applied in an almost in-plane direction of the magnetic recording medium 10 in the magnetic recording medium 10. This resonance magnetic field 80 is a high frequency magnetic field of a microwave band from about 1 GHz to about 50 GHz, the microwave band including the ferromagnetic resonance frequency FR of the magnetic recording layer 10e of the magnetic recording medium 10 or frequencies around the ferromagnetic resonance frequency FR.

The coercivity of the magnetic recording layer 10e may be efficiently reduced by superimposing the resonance magnetic field 80 on a perpendicular recording magnetic field 81, which is to be applied to the magnetic recording layer by the main magnetic pole layer 31b1 of the recording head element. As a result, the strength of a write magnetic field may be significantly reduced in a perpendicular direction necessary for writing (in a direction that is perpendicular to or almost perpendicular to a surface of a surface layer of the magnetic recording layer 10e). As a result of reducing coercivity, magnetization reversal occurs more easily. Thus, recording may be efficiently performed with a smaller recording magnetic field.

Figure 6:
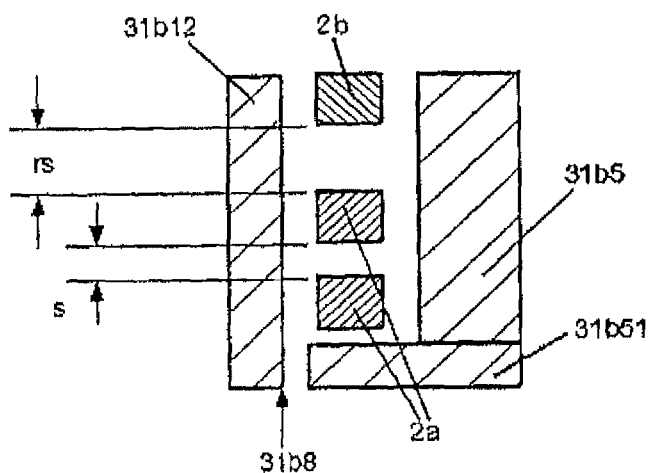
FIG. 6 is a cross-sectional view of a magnetic head of a first embodiment.

FIG. 6 is a cross-sectional view of the recording head element 31b in the magnetic head 31 of the first embodiment of the present invention, viewed in a Track Width Direction direction of FIG. 2. Microwave power from the microwave power generator 19 propagates through a transmission line provided in the suspension 9 and is supplied to microwave magnetic field generating lines 2a, thereby generating a microwave magnetic field. At least two microwave magnetic field generating lines 2a are provided on the side where the trailing shield portion 31b51 is provided, with respect to the main magnetic pole main layer 31b12.

Figure 7:
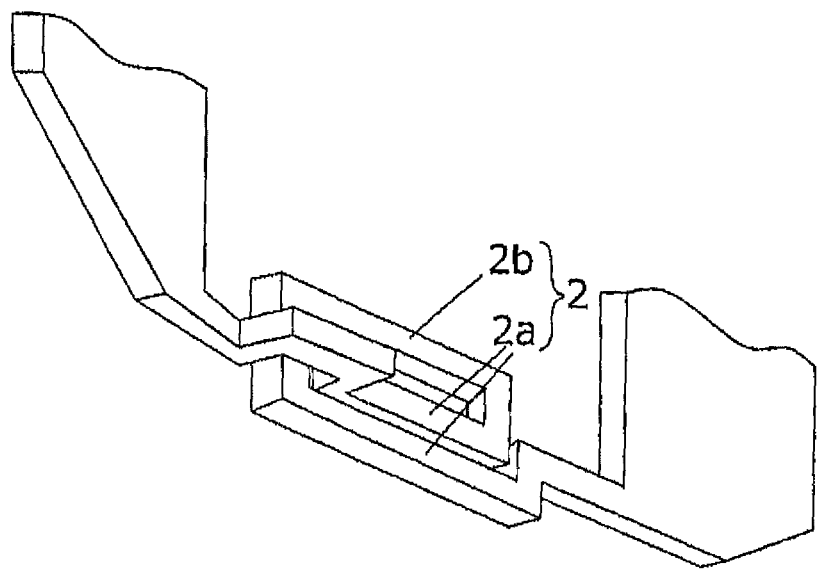
FIG. 7 is a perspective view schematically illustrating the configuration of a microwave magnetic field generating element, which is a main portion of the magnetic head of the first embodiment of the present invention.

FIG. 7 is a perspective view schematically illustrating the configuration of the microwave magnetic field generating element 2, which is a main portion of the magnetic head 31 of the first embodiment. The microwave magnetic field generating element 2 has a coil configuration formed by two microwave magnetic field generating lines 2a that generate a microwave magnetic field and a return line 2b, the microwave magnetic field generating lines 2a and the return line 2b being formed by a continuous single line.

In addition, microwave currents having almost the same phase and almost the same amplitude flow through the microwave magnetic field generating lines 2a in the same direction. As a result, by applying, to a medium, microwave magnetic fields having the same phase from a plurality of microwave magnetic field generating lines 2a in a superimposition manner, even though the same microwave current is used, the strength of a microwave magnetic field to be applied to the recording medium is increased. Thus, while keeping the amount of heat generated by a single microwave magnetic field generating line 2a the same, the strength of a microwave magnetic field may be increased. Consequently, while the microwave magnetic field generating lines 2a are prevented from being broken by heat, the strength of a microwave magnetic field may be increased.

The above-described microwave magnetic field generating lines 2a are arranged near a trailing edge 31b8 of the main magnetic pole. As a result, the strength of a microwave magnetic field to be applied to the magnetic recording medium 10 directly under the trailing edge 31b8 may be increased, the trailing edge 31b8 being at a position where a data signal is recorded in the magnetic recording medium 10 using the perpendicular recording magnetic field 81 generated from the main magnetic pole main layer 31b12 of the recording head element 31b.

A microwave current flows through the return line 2b in the direction opposite to that of a microwave current that flows through the microwave magnetic field generating lines 2a. Thus, a microwave magnetic field is generated from the return line 2b, the microwave magnetic field having the direction opposite to the direction of a microwave magnetic field generated by the microwave magnetic field generating lines 2a. The microwave magnetic field generating lines 2a are arranged on the side where the ABS 30a is provided (on the side where the magnetic recording medium 10 is provided), and the return line 2b is arranged at a position far from the ABS 30a (a position far from the magnetic recording medium 10). As a result, an effect of a magnetic field generated from a return line and having the opposite direction may be reduced, the magnetic field reducing a magnetic field generated from microwave magnetic field generating lines.

In addition, a distance s between the microwave magnetic field generating lines 2a is shorter than a distance rs between the microwave magnetic field generating line 2a closest to the return line 2b (the upper side) and the return line 2b. As a result, the magnetic fields generated from the microwave magnetic field generating lines 2a may be more efficiently applied to the magnetic recording medium 10, and an effect of a magnetic field generated from the return line 2b and having the opposite direction may be reduced, the magnetic field reducing the magnetic fields generated from the microwave magnetic field generating lines 2a.

The materials of the microwave magnetic field generating lines 2a and the return line 2b are formed of conductors such as copper (Cu) and gold (Au).

In addition, a sectional form of these microwave magnetic field generating lines 2a is a square in the present embodiment; however, the sectional form does not have any limitations as long as a certain microwave drive current may flow through the microwave magnetic field generating lines 2a and microwave magnetic fields may be generated around them, and may be determined as appropriate.

In addition, the smaller the distance s between elements, which are the microwave magnetic field generating lines 2a, the better if there are no problems in terms of reliability such as electrical insulating characteristics.

As a result, a decrease in a microwave magnetic field to be applied to the magnetic recording medium 10 from a microwave magnetic field generating line that is positioned far from the magnetic recording medium 10 may be reduced.

Second Embodiment

Figure 8:
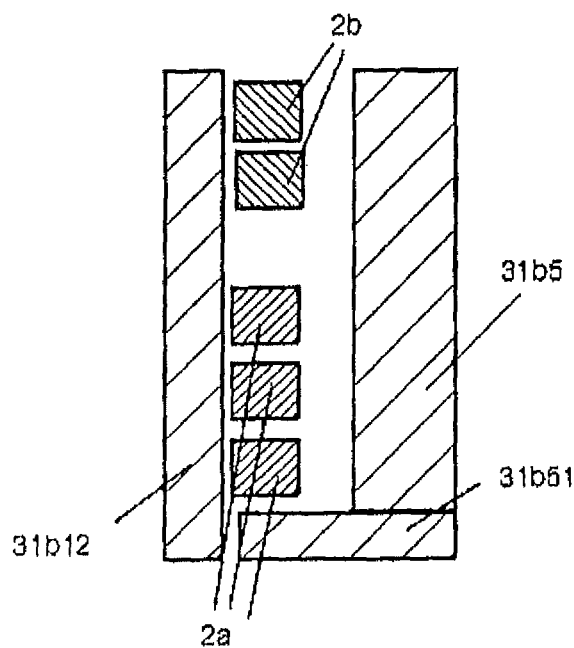
FIG. 8 is a cross-sectional view of a magnetic head of a second embodiment.

FIG. 8 is a cross-sectional view of the recording head element 31b in the magnetic head 31 of a second embodiment of the present invention, viewed in the Track Width Direction direction of FIG. 2. Three microwave magnetic field generating lines 2a are arranged so as to be perpendicular to the ABS 30a. The strength of a microwave magnetic field may further be increased by arranging three microwave magnetic field generating lines 2a.

Figure 9:
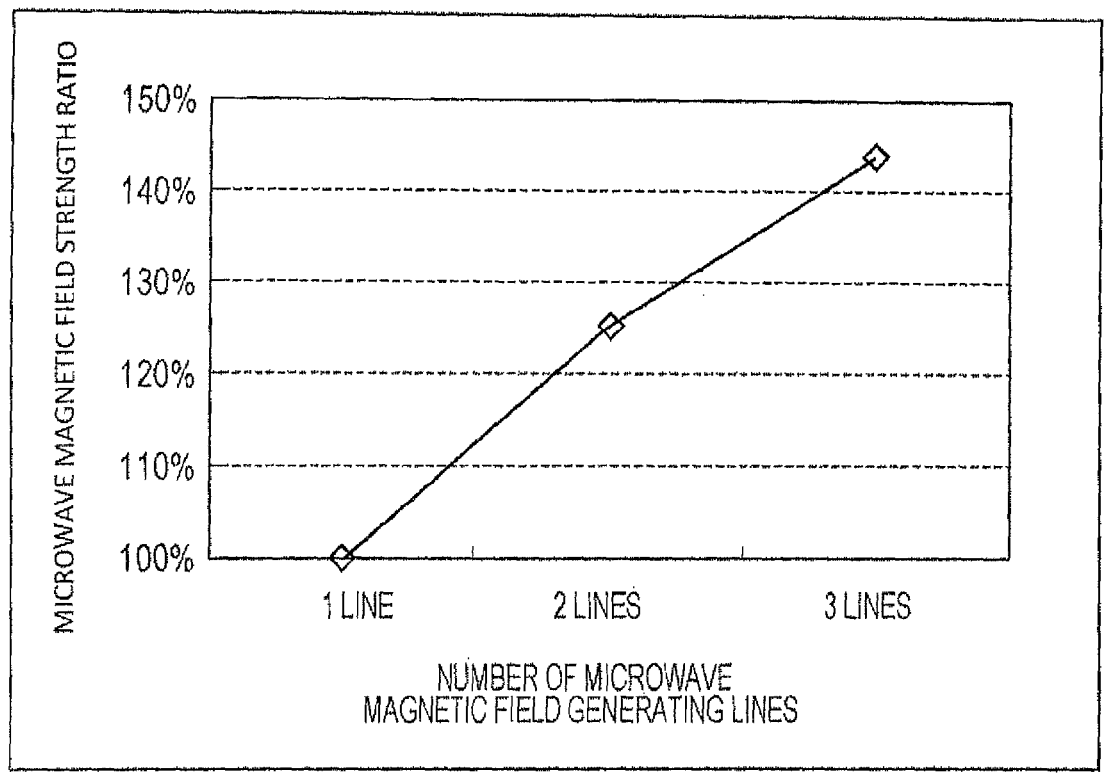
FIG. 9 is a graph illustrating a relationship between the ratio between microwave magnetic field intensities and the number of microwave magnetic field generating lines.

FIG. 9 illustrates the ratio of, directly under the trailing edge, the strength of microwave generation magnetic fields of the first and second embodiments to the strength of a microwave generation magnetic field of a conventional example (one microwave magnetic field generating line). Comparisons between the strength are made using the same microwave drive current value. When the microwave magnetic field generating element 2 is configured as in the first embodiment (two microwave magnetic field generating lines) and as in the second embodiment (three microwave magnetic field generating lines), it is clear that the strength of a microwave magnetic field is increased by approximately 25% in the first embodiment and by approximately 44% in the second embodiment with respect to the conventional example.

Third Embodiment

Figure 10:
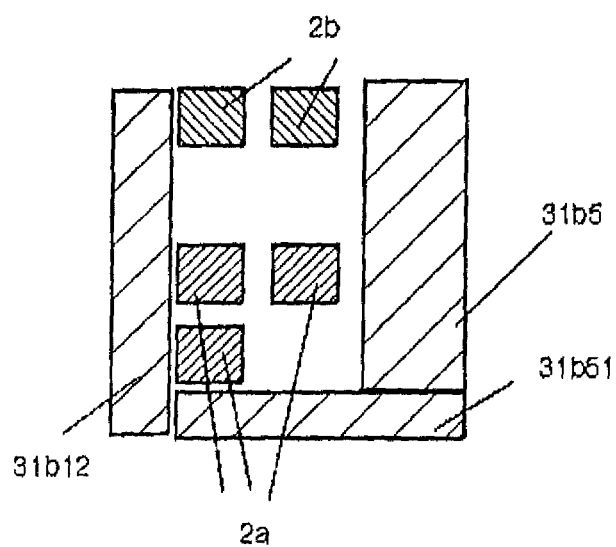
FIG. 10 is a cross-sectional view of a magnetic head of a third embodiment.

FIG. 10 is a cross-sectional view of the recording head element 31b in the magnetic head 31 of a third embodiment of the present invention, viewed in the Track Width Direction direction of FIG. 2. Three microwave magnetic field generating lines 2a are arranged so as not to be perpendicular to the ABS 30a but to be in a triangular form. In the third embodiment, the microwave magnetic field generating line 2a farthest from the magnetic recording medium 10 in the second embodiment may be made closer to the magnetic recording medium 10. In addition, in the third embodiment, a microwave magnetic field strength may be increased than that in the first embodiment.

However, compared with a conventional example, in the first to third embodiments, the greater the number of the magnetic field generating lines 2a and 2b, the longer the length of the entire line of the microwave magnetic field generating element 2, thereby increasing the value of resistance of the element. When power to be supplied to the microwave magnetic field generating element 2 is the same, an increased value of resistance causes the value of a current that flows through the microwave magnetic field generating lines 2a to decrease and the strength of a generated microwave magnetic field to decrease.

Figure 11:
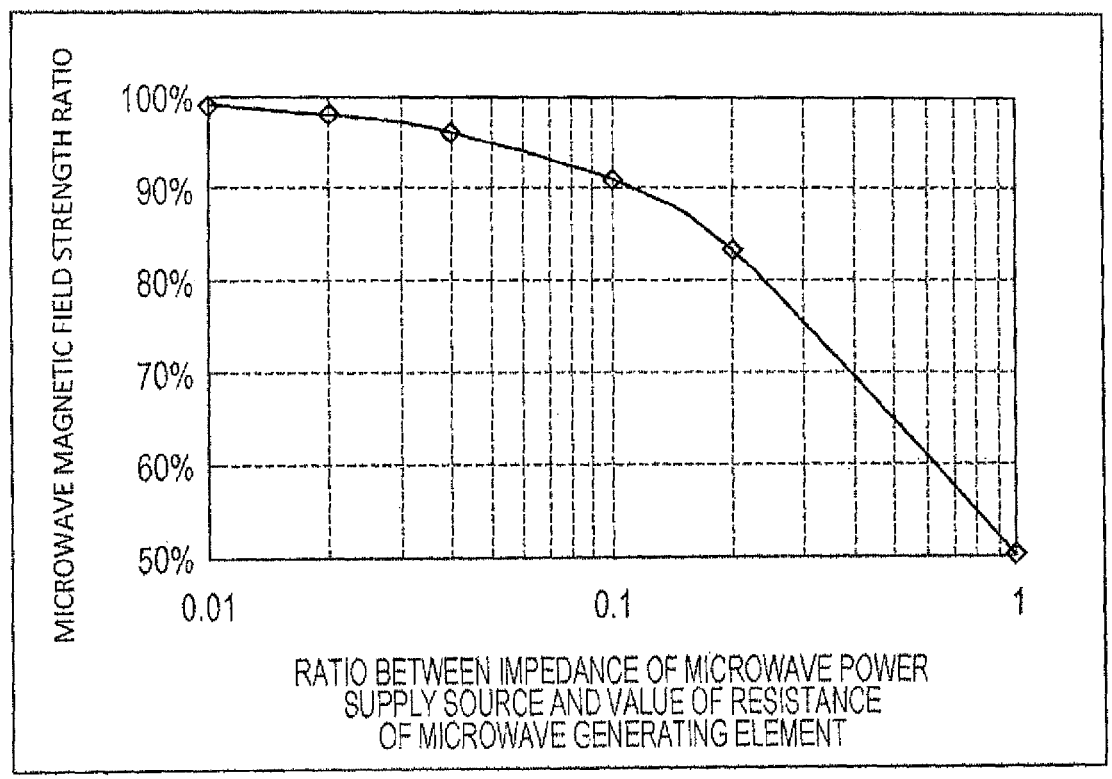
FIG. 11 is a graph illustrating a relationship between an impedance ratio and the ratio between microwave magnetic field intensities.

FIG. 11 illustrates, in the case where power to be supplied to the microwave magnetic field generating element 2 is constant, a relationship between a certain ratio and the ratio between microwave magnetic fields, the certain ratio being a ratio between the value of resistance of the microwave magnetic field generating line 2 and the impedance of the microwave power generator 19 viewed from the microwave magnetic field generating element 2 (the value of resistance of the microwave magnetic field generating element/the impedance obtained on a microwave power generator side). When the impedance ratio is 0 (the value of resistance of the microwave magnetic field generating element 2 is 0), the microwave magnetic field strength is highest. When the microwave magnetic field strength in this case is set to 100%, the horizontal axis represents the impedance ratio and the vertical axis represents the ratio between the microwave magnetic field strength.

Since the rate of rise of the microwave magnetic field strength is approximately 25% in the first embodiment, the impedance ratio that does not cancel this rate of rise is approximately 0.3 or lower.

In the case where power to be supplied to the microwave magnetic field generating element 2 is the same as that in the conventional example, when the impedance ratio is 0.3 or lower, the microwave magnetic field strength increases with the configuration in the first embodiment, compared with the conventional example.

As an example, when the impedance of the microwave power generator 19 viewed from the microwave magnetic field generating element 2 is 50Ω and the value of resistance of the microwave magnetic field generating element 2 is 5Ω, the impedance ratio is 0.1. Compared with the case where the value of resistance is 0, a magnetic field becomes 90% thereof and the microwave magnetic field strength is reduced by 10%. However, the rate of rise of the microwave magnetic field strength is 25% in the first embodiment and, on balance, the generation magnetic field strength is increased by 15%. Since the value of resistance of the conventional example (a microwave magnetic field generating element having a single-line configuration) is actually not 0, the rate of rise of the magnetic field strength becomes higher in the present embodiment. However, here, in order to facilitate understanding of effects, comparisons are made with a value of resistance of 0 in an ideal state.

Likewise, since the rate of rise of the microwave magnetic field strength is approximately 44% in the second embodiment, the impedance ratio that does not cancel this rate of rise is approximately 0.8 or lower.

Figure 12:
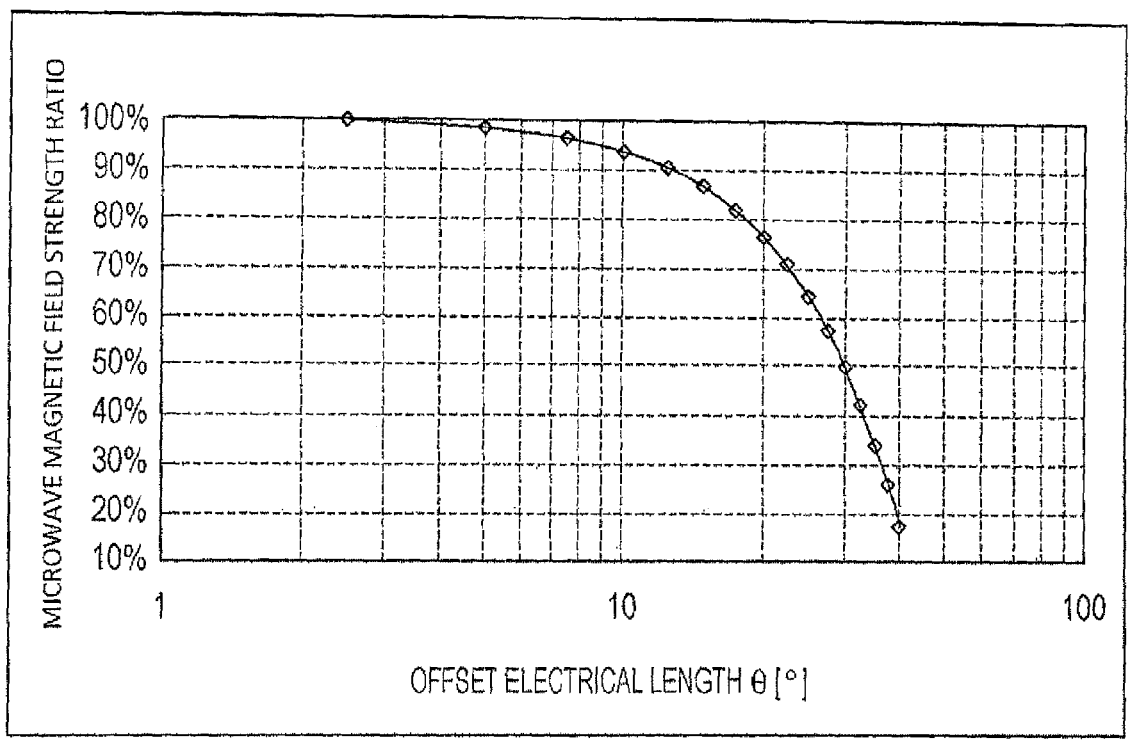
FIG. 12 is a graph illustrating a relationship between an electrical length and the ratio between microwave magnetic field intensities.

In addition, compared with the conventional example, in the first to third embodiments, since the length of the entirety of the microwave magnetic field generating lines is increased, the value of resistance and also the inductance value of the element are increased. An offset electrical length is generated due to an inductance that a microwave magnetic field generating element has. The longer the offset electrical length, the lower the microwave magnetic field strength. FIG. 12 illustrates an electrical length and a ratio between microwave magnetic field strength in the case where power to be supplied to the microwave magnetic field generating element 2 is constant. When the electrical length is 0, the microwave magnetic field strength is highest and the value here is set to 100%.

Since the rate of rise of the microwave magnetic field strength is approximately 25% in the first embodiment, the offset electrical length that does not cancel this rate of rise is approximately 20° or smaller.

Likewise, since the rate of rise of the microwave magnetic field strength is approximately 44% in the second embodiment, the offset electrical length that does not cancel this rate of rise is approximately 28° or smaller.

Figure 13:
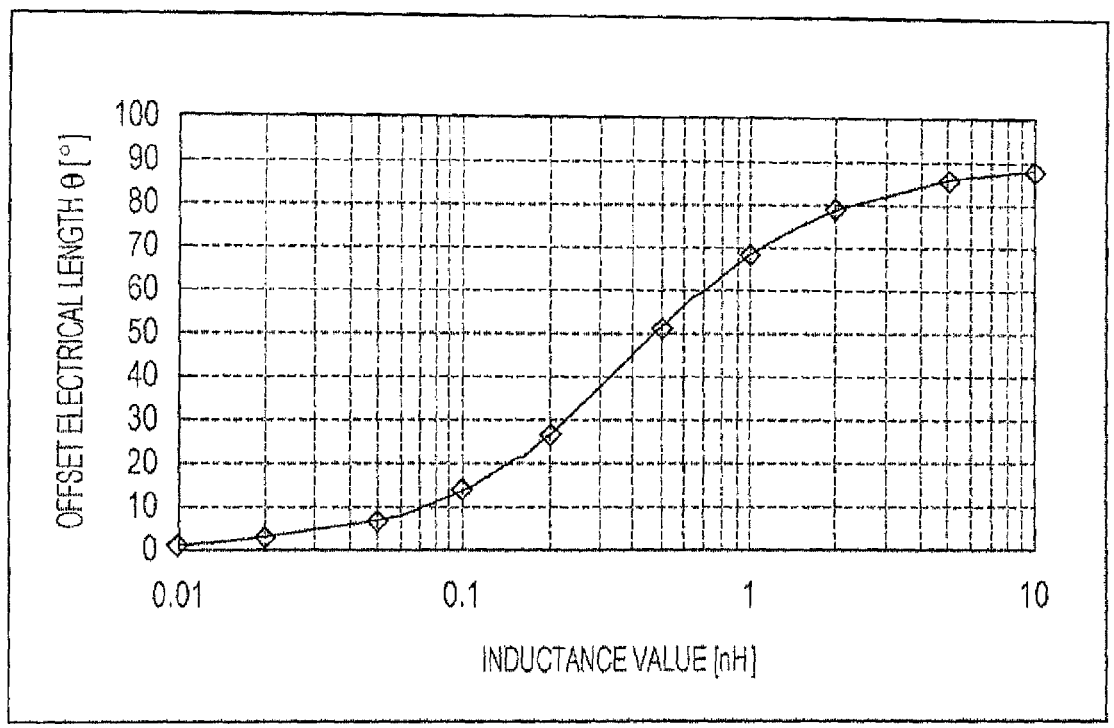
FIG. 13 is a graph illustrating a relationship between an inductance value and an offset electrical length at 20 GHz.

FIG. 13 illustrates, as an example, a graph into which a relationship between the inductance value and the offset electrical length obtained at 20 GHz is converted. For example, in order to realize that the offset electrical length is 20° or smaller, it is desirable that the inductance value of a microwave magnetic field generating line be approximately 0.15 [nH] or lower.

In reality, a decrease in the microwave magnetic field strength caused by the above-described resistor and a decrease in the microwave magnetic field strength caused by the offset electrical length affect in a synergistic manner, and the lower the impedance ratio, the greater the power to be consumed by a microwave magnetic field generating line, thereby increasing the amount of generated heat. Thus, it is desirable that design be made such that the ratio between microwave magnetic field strength does not sink below 90% under each condition. Thus, a more desirable impedance ratio is 0.1 or lower and it is more desirable that the offset electrical length satisfy 10° or smaller.

Fourth Embodiment

Figure 14:
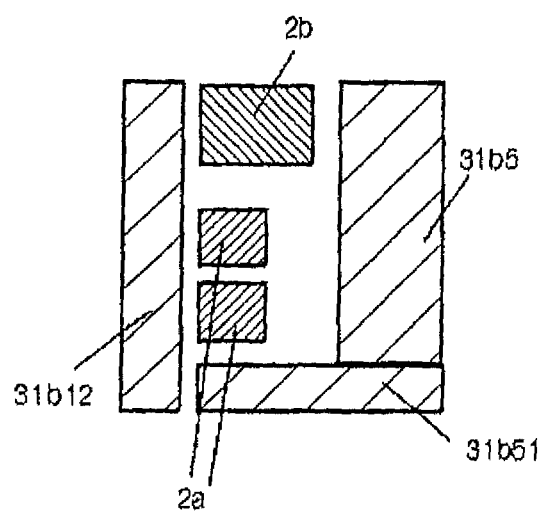
FIG. 14 is a cross-sectional view of a magnetic head of a fourth embodiment.

FIG. 14 illustrates a cross-sectional view of the recording head element 31b in the magnetic head 31 of a fourth embodiment, viewed in the Track Width Direction direction of FIG. 2. A cross-sectional area of the return line 2b is greater than that of the microwave magnetic field generating lines 2a. By increasing the cross-sectional area of the return line 2b, there is an effect of reducing the value of resistance and the value of inductance of the entirety of the element and an effect of reducing the amount of generated heat of the return line 2b. Furthermore, even when the area of the return line 2b is increased, the microwave magnetic field strength is not affected.

Fifth Embodiment

Figure 15:
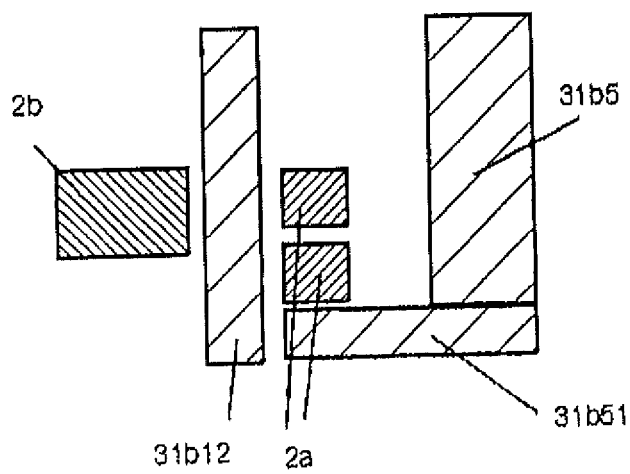
FIG. 15 is a cross-sectional view of a magnetic head of a fifth embodiment.
Figure 16:
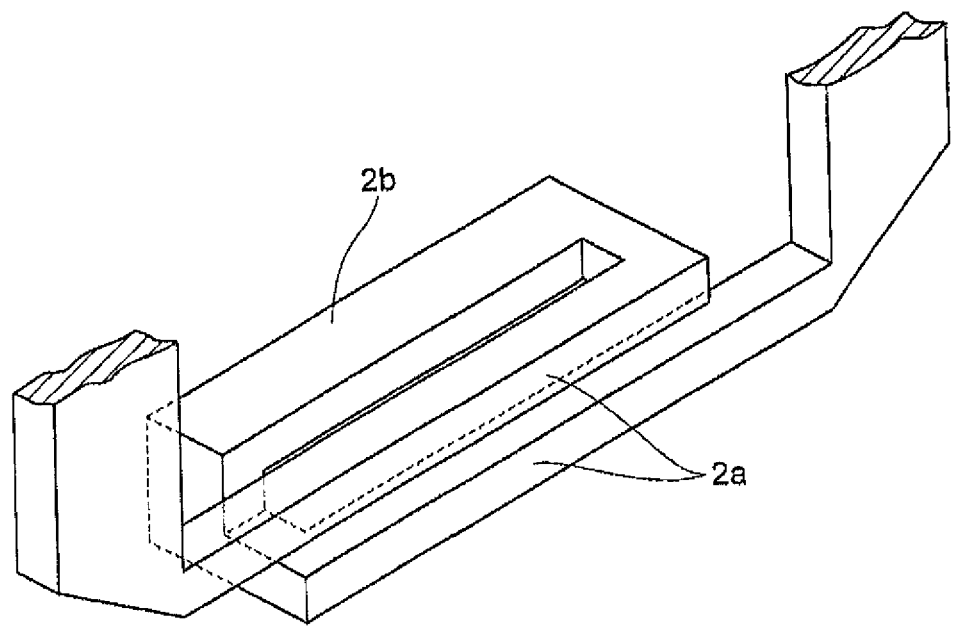
FIG. 16 is a perspective view schematically illustrating the configuration of a microwave magnetic field generating element of the magnetic head of the fifth embodiment.

FIG. 15 is a cross-sectional view of the recording head element 31b in the magnetic head 31 of a fifth embodiment, viewed in the Track Width Direction direction of FIG. 2. In the case where the cross-sectional area of the return line 2b is increased as in the fourth embodiment or in the case where the microwave magnetic field generating lines 2a and the return line 2b are arranged so as to be perpendicular to the ABS 30a as in the second embodiment, there may be the case where a sufficient area of the return line 2b may not be obtained or the microwave magnetic field generating lines 2a and the return line 2b may not be arranged in a perpendicular manner since members such as the main magnetic pole yoke layer 31b11 and the like in FIG. 3 are arranged in the neighborhood. In that case, as in the fifth embodiment, a divisional arrangement may be performed in which the return line 2b is arranged on the leading side and the microwave magnetic field generating lines 2a and the return line 2b are arranged on the side where the trailing shield portion 31b51 is provided and on the side where the reproducing head element 31a is provided with respect to the main magnetic pole main layer 31b12. FIG. 16 is a perspective view schematically illustrating the configuration of the microwave magnetic field generating element 2, which is a main portion of the magnetic head of the fifth embodiment.

Sixth Embodiment

Figure 17:
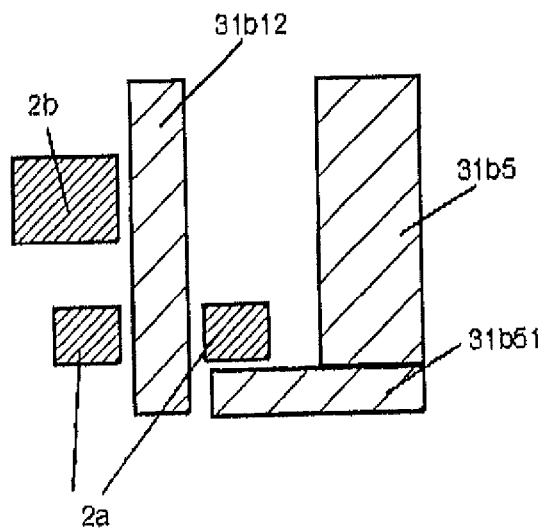
FIG. 17 is a cross-sectional view of a magnetic head of a sixth embodiment.
Figure 18:
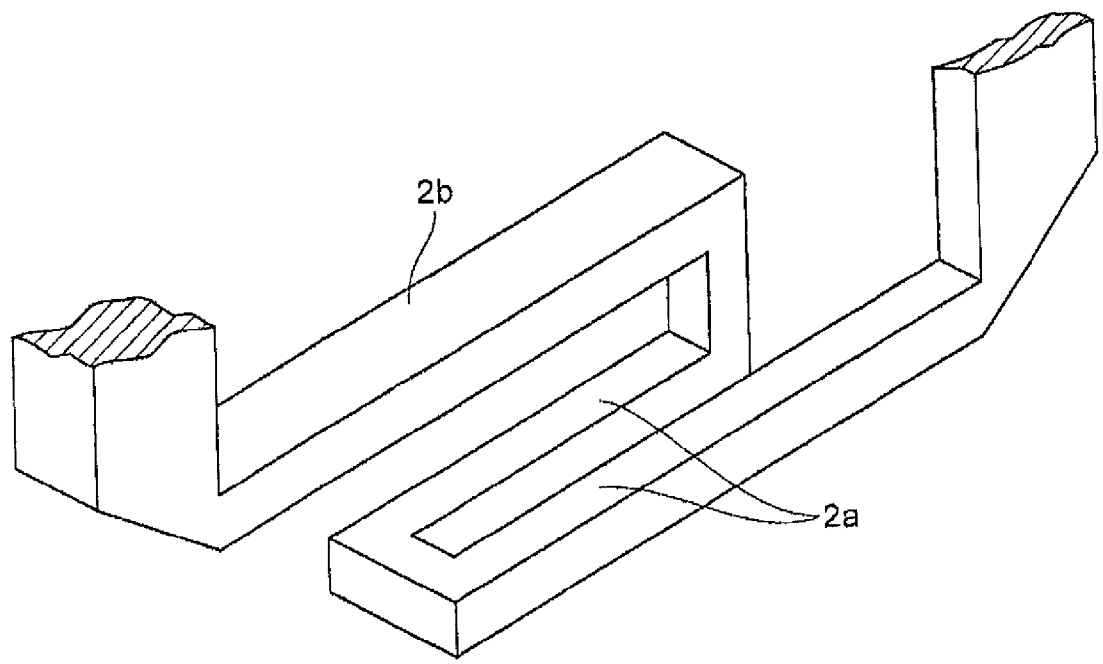
FIG. 18 is a perspective view schematically illustrating the configuration of a microwave magnetic field generating element of the magnetic head of the sixth embodiment.

FIG. 17 is a cross-sectional view of the recording head element 31b in the magnetic head 31 of a sixth embodiment, viewed in the Track Width Direction direction of FIG. 2. In the case where the cross-sectional area of the return line 2b is increased as in the fourth embodiment or in the case where the microwave magnetic field generating lines 2a and the return line 2b are arranged so as to be perpendicular to the ABS 30a as in the second embodiment, there may be the case where a sufficient area of the return line 2b may not be obtained or the microwave magnetic field generating lines 2a and the return line 2b may not be arranged in a perpendicular manner since members such as the main magnetic pole yoke layer 31b11 and the like in FIG. 3 are arranged in the neighborhood. In that case, as in the sixth embodiment, a divisional arrangement may be performed in which the return line 2b and one of the microwave magnetic field generating lines 2a are arranged on the leading side, and one of the microwave magnetic field generating lines 2a and the one of the microwave magnetic field generating lines 2a and the return line 2b are arranged on the side where the trailing shield portion 31b51 is provided and on the side where the reproducing head element 31a is provided with respect to the main magnetic pole main layer 31b12. FIG. 18 is a perspective view schematically illustrating the configuration of the microwave magnetic field generating element 2, which is a main portion of the magnetic head of the fifth embodiment.

Seventh Embodiment

Figure 19:
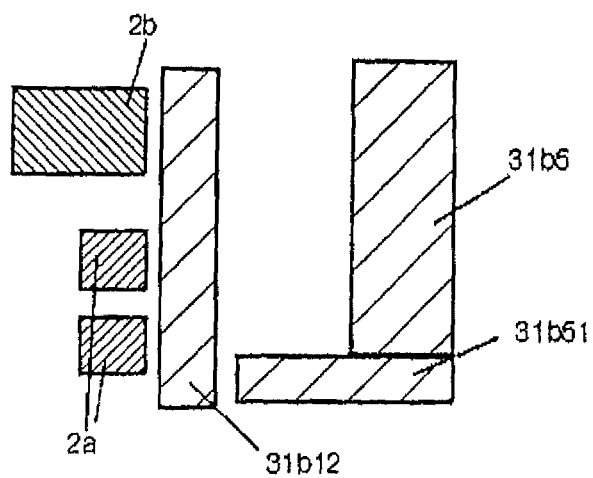
FIG. 19 is a cross-sectional view of a magnetic head of a seventh embodiment.

FIG. 19 is a cross-sectional view of the recording head element 31b in the magnetic head 31 of a seventh embodiment, viewed in the Track Width Direction direction of FIG. 2. In the case where the cross-sectional area of the return line 2b is increased as in the fourth embodiment or in the case where the microwave magnetic field generating lines 2a and the return line 2b are arranged so as to be perpendicular to the ABS 30a as in the second embodiment, there may be the case where a sufficient area of the return line 2b may not be obtained or the microwave magnetic field generating lines 2a and the return line 2b may not be arranged in a perpendicular manner since members such as the main magnetic pole yoke layer 31b11 and the like in FIG. 3 are arranged in the neighborhood. In that case, as in the seventh embodiment, the microwave magnetic field generating lines 2a and the return line 2b (all the lines) may be arranged on the leading side.

The present invention is applicable to a thin film magnetic head to be used in a microwave assisted magnetic recording technology in which a data signal is written into a magnetic recording medium by superimposing microwaves, and furthermore applicable to a magnetic recording and reproducing apparatus that uses a microwave assisted magnetic recording technology.

REFERENCE SIGNS LIST

2 . . . microwave magnetic field generating element, 2a . . . microwave magnetic field generating line, 2b . . . return line, 8 . . . magnetic recording and reproducing device, 9 . . . suspension, 10 . . . magnetic recording medium, 10a . . . disk substrate, 10b . . . magnetic orientation layer, 10c . . . soft magnetic backing layer, 10d . . . intermediate layer, 10e . . . magnetic recording layer, 10f . . . protection layer, 11 . . . spindle motor, 11a . . . rotation axis, 12 . . . head gimbal assembly (HGA), 13 . . . magnetic head slider, 14 . . . VCM (voice coil motor), 15 . . . pivot bearing axis, 16 . . . carriage, 19 . . . microwave power generator, 30 . . . magnetic head slider substrate, 30a . . . ABS (Air Bearing Surface), 30b . . . perpendicular element forming surface, 30d . . . magnetic head slider end face, 31 . . . magnetic head, 31a . . . reproducing head element, 31a1 . . . MR multilayer product, 31a2 . . . bottom portion shield layer, 31a3 . . . top portion shield layer, 31b . . . recording head element, 31b1 . . . main magnetic pole layer, 31b11 . . . main magnetic pole yoke layer, 31b12 . . . main magnetic pole main layer, 31b2 . . . trailing gap layer, 31b3 . . . write coil, 31b4 . . . write coil insulating layer, 31b5 . . . auxiliary magnetic pole layer, 31b51 . . . trailing shield portion, 31b6 . . . auxiliary shield layer, 31b7 . . .

leading gap layer, 31b8 ... trailing edge, 32 ... protection unit, 33, 34, 35, 36, 37, 38, 39, and 40 ... terminal electrode, 41 and 42 ... wiring member, 80 ... resonance magnetic field

What is claimed is:

1. A microwave-assisted magnetic head, comprising:
a recording head element having a main magnetic pole main layer and a trailing shield,
a reproducing head element, and
a microwave magnetic field generating element,
wherein the microwave magnetic field generating element has a coil configuration in which a plurality of microwave magnetic field generating lines and a return line are formed by a continuous single line,
at least one of the plurality of microwave magnetic field generating lines is arranged on a trailing shield side or a reproducing head element side with respect to the main magnetic pole main layer of the recording head element,
the return line is arranged on the trailing shield side or the reproducing head element side with respect to the main magnetic pole main layer,
wherein the plurality of microwave magnetic field generating lines are configured such that a microwave current that flows through the plurality of microwave magnetic field generating lines is in the same direction with respect to the microwave-assisted magnetic head,
the return line is configured such that the microwave current flows through the return line in a direction that is opposite to the direction in which the microwave current flows through the plurality of microwave magnetic field generating lines,
the plurality of microwave magnetic field generating lines are arranged so as to be separated from each other in a direction perpendicular to a direction in which the microwave current flows through therein, and
the plurality of microwave magnetic field generating lines are arranged so as to be separated from each other in a direction away from an air bearing surface of the microwave-assisted magnetic head.

2. The microwave-assisted magnetic head according to claim 1, wherein the plurality of microwave magnetic field generating lines are arranged closer to an ABS side than the return line.

3. The microwave-assisted magnetic head according to claim 1, wherein a distance between the plurality of microwave magnetic field generating lines is shorter than a distance between the microwave magnetic field generating lines and the return line.

4. The microwave-assisted magnetic head according to claim 1, wherein a cross-sectional area of at least one of the plurality of microwave magnetic field generating lines is smaller than a cross-sectional area of a line other than the microwave magnetic field generating lines through which a microwave current flows in a different direction from the direction of a microwave current flowing through the microwave magnetic field generating lines.

5. The microwave-assisted magnetic head according to claim 1, wherein a frequency of a current that flows through the microwave magnetic field generating lines is between 1 GHz and 50 GHz.

6. The microwave-assisted magnetic head according to claim 1, wherein a divisional arrangement is performed in which the microwave magnetic field generating lines and the return line are arranged on the trailing shield side and the reproducing head element side with respect to the main magnetic pole main layer.

7. The microwave-assisted magnetic head according to claim 1, wherein
the return line includes a plurality of return lines, and
the number of the plurality of microwave magnetic field generating lines is more than the number of the return lines.

8. The microwave-assisted magnetic head according to claim 1, wherein the microwave current flows through the plurality of microwave magnetic field generating lines in a track width direction.

9. The microwave-assisted magnetic head according to claim 1, wherein a cross-sectional area of the return line is greater than that of the microwave magnetic field generating lines.

10. A head gimbal assembly, comprising: the microwave-assisted magnetic head according to claim 1.

11. A magnetic recording and reproducing apparatus, comprising: a magnetic recording medium; and the head gimbal assembly according to claim 10.

* * * * *